United States Patent
Klein

Patent Number: 5,919,252
Date of Patent: Jul. 6, 1999

[54] PROCESS AND APPARATUS FOR ADAPTIVE BUS TERMINATION

[75] Inventor: Dean A. Klein, Lake City, Minn.

[73] Assignee: Micron Electronics, Inc., Nampa, Id.

[21] Appl. No.: 08/977,640

[22] Filed: Nov. 24, 1997

Related U.S. Application Data

[63] Continuation of application No. 08/012,020, Feb. 1, 1993, abandoned, which is a continuation of application No. 07/737,137, Jul. 29, 1991, abandoned.

[51] Int. Cl.⁶ .................................................. G06F 13/00
[52] U.S. Cl. ............................................. 710/100; 326/30
[58] Field of Search ............................. 326/30; 395/280, 395/281, 306, 309

[56] References Cited

U.S. PATENT DOCUMENTS

| | | | |
|---|---|---|---|
| 4,220,876 | 9/1980 | Ray | 327/594 |
| 4,748,426 | 5/1988 | Stewart | 333/22 R |
| 5,029,284 | 7/1991 | Feldbaumer et al. | 307/443 |
| 5,309,569 | 5/1994 | Warchol | 395/306 |
| 5,467,455 | 11/1995 | Gay et al. | 395/281 |

*Primary Examiner*—Glenn A. Auve
*Attorney, Agent, or Firm*—Dorsey & Whitney LLP

[57] ABSTRACT

Process and apparatus for reducing termination resistors on a CPU data bus and a CPU address bus. The reduced termination resistors are switched in, such as by a transistor switch or other switch, only during read operations when a CPU is receiving data from its bus or a CPU data bus only during hold acknowledge cycles. This increases the speed of the buses and allows the buses to be operation dependent. Further, power can be reduced during certain busing operations, resulting in cooler running and more reliable operations. Uses for adaptive termination includes microprocessor buses for data lines, address lines and control lines; peripheral devices for matching impedance to cable; and D/A converters. Variations on the device includes pull-up, pull-down, multiple levels/strengths, programmable with EPROM type cell, multiple units in the same package, and multiple values in the same package.

7 Claims, 5 Drawing Sheets

GENERIC ADAPTIVE SIGNAL PULL-UP

ADAPTIVE SIGNAL PULL-DOWN

ADAPTIVE SIGNAL PULL-UP

EXAMPLE OF EPROM CELL BASED DEVICE

MULTIPLE VALUE EXAMPLE

PROCESS AND APPARATUS FOR ADAPTIVE BUS TERMINATION

This is a continuation of application Ser. No. 08/012,020, filed Feb. 1, 1993, now abandoned which is a continuation of application Ser. No. 07/737,137 filed Jul. 29, 1991, now abandoned.

BACKGROUND OF THE INVENTION

1. Field of the Invention

The present invention relates to computers, and more particularly, pertains to resistive termination of CPU data buses and CPU address buses.

2. Description of the Prior Art

In prior art computer operations, the data buses have had a nominal termination between the power supply, Vsupply and the data bus. Regardless of the operations, this nominal termination was constant and fixed, resulting in slower running computers because of a fixed and constant nominal termination and hotter running computers because of power consumption.

The present invention overcomes the disadvantages of the prior art by providing an adaptive bus termination where a reduced termination resistor is switched in and out during predetermined periods of operation, such as, for example read operations for a CPU data bus and hold acknowledge cycles for a CPU address bus.

SUMMARY OF THE INVENTION

The general purpose of the present invention is to provide a process and apparatus for adaptive bus termination, particularly for a CPU data bus and a CPU address bus.

According to one embodiment of the present invention, there is provided a bus, a nominal termination resistance, and a reduced termination resistance which is switched by a switching transistor or other like element. As an example, for a CPU data bus, this reduced termination resistor is switched in during the read operation when the CPU is receiving data from the data bus. As an example, for a CPU address bus, this reduced termination resistance is switched in during hold acknowledge cycles.

Other embodiments of the present invention include an adaptive signal pull-up, an adaptive signal pull-down, an EPROM cell device, and a multiple value device.

Uses for adaptive termination include microprocessor buses for data lines, address lines and control lines; peripheral devices for matching impedance to cable; and D/A converters. Variations on the device include pull-up, pull-down, multiple levels/strengths, programmable with EPROM type cell, multiple units in the same package, and multiple values in the same package.

Significant aspects and features of the present invention include a reduced termination resistor which provides higher speeds, as well as cooler running and more reliable operation of computers.

Another significant aspect and feature of the present invention is where a bus has multiple modes of operation, adaptive termination can be provided to suit the mode of operation allowing higher speed operation, especially on open collector-type buses without excessively loading the bus during other modes of operation.

Having thus described the embodiments of the present invention, it is the principal object hereof to provide a process and apparatus for adaptive bus termination.

Objects of the present invention include circuits utilizing a nominal termination resistance Rnom and a reduced termination resistance Rmin, which are switched during busing operations. The teachings of the present invention can be extended for connection to other types of buses or components for any other predetermined desired operating conditions.

BRIEF DESCRIPTION OF THE DRAWINGS

Other objects of the present invention and many of the attendant advantages of the present invention will be readily appreciated as the same becomes better understood by reference to the following detailed description which when considered in connection with the accompanying drawings, in which like reference numerals designate like parts throughout the figures thereof and wherein.

DESCRIPTION OF THE PREFERRED EMBODIMENTS

Figure 1:
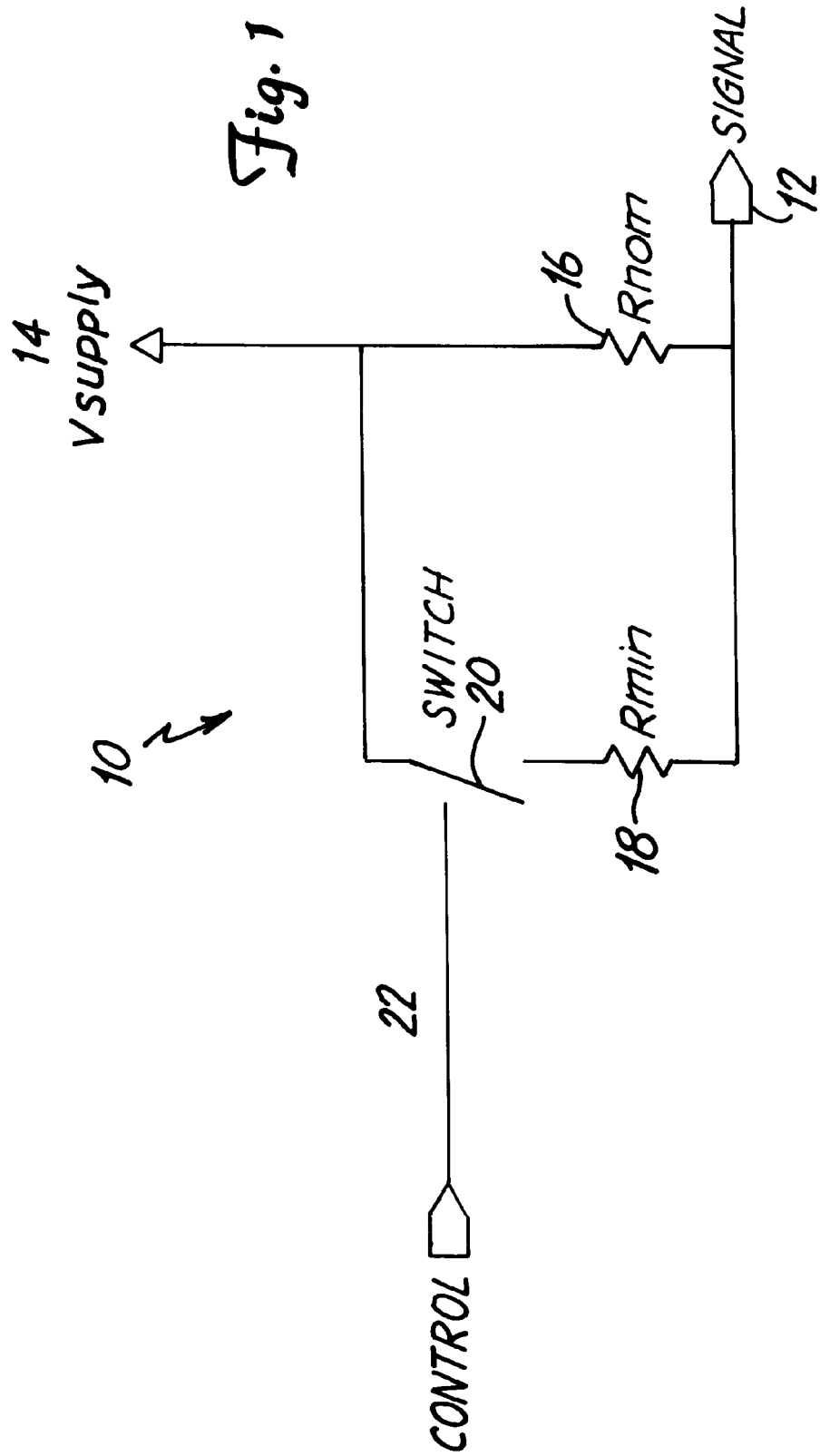
FIG. 1 illustrates an electrical circuit schematic diagram of an adaptive bus termination, the present invention.

FIG. 1 illustrates an electrical circuit schematic diagram of an adaptive bus termination 10, the present invention, including a signal bus 12, a power source Vsupply 14, a nominal termination resistance Rnom 16, a reduced termination resistance Rmin 18, and a switch 20. A control line 22 determines the timing of the operation of the switch 20 as later described in detail. The reduced termination resistance Rmin is operation dependent, and can be utilized during certain busing operations, resulting in a reduction of power and a cooler running, more reliable computer. The adaptive termination provides termination for the mode of operation, allowing higher speed operation, especially on open collector-type buses, without excessively loading the bus in other modes of operations.

Mode of Operation

For a CPU data bus, the termination resistor Rmin is switched in only during read operations when the CPU is receiving data from the data bus, not during the busing operations. For the CPU address bus, reduced termination resistor Rmin is only switched in during a hold acknowledge cycle.

Uses for adaptive termination includes microprocessor buses for data lines, address lines and control lines; peripheral devices for matching impedance to cable; and D/A converters. Variations on the device includes pull-up, pull-down, multiple levels/strengths, programmable with EPROM type cell, multiple units in the same package, and multiple values in the same package.

Description of the First Alternative Embodiment

Figure 2:
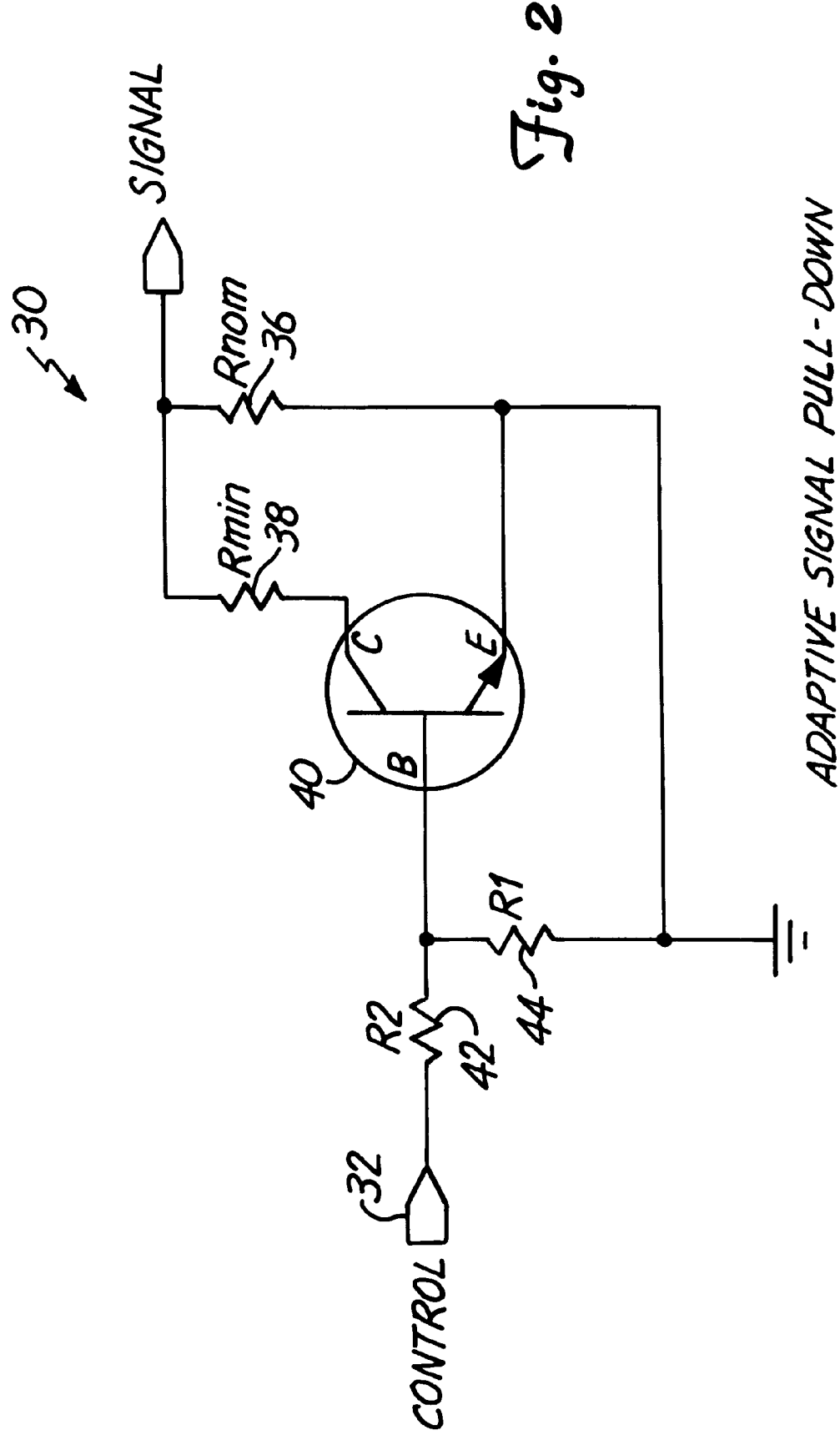
FIG. 2 illustrates an electrical circuit schematic diagram of a first alternative embodiment of an adaptive signal pull down.

FIG. 2 illustrates an electrical circuit schematic diagram of an adaptive signal pull down termination 30, the present invention, including a control bus 32, a nominal termination resistance Rnom 36, a reduced termination resistance Rmin 38, a switching transistor 40, and biasing resistors R1-42 and R2-44. The control bus 32 determines the timing of the operation of the switching transistor 40 as later described in detail. The reduced termination resistance is operation dependent, and can be utilized during certain busing operations, resulting in a reduction of power and a cooler running, more reliable computer. The adaptive termination provides termination for the mode of operation, allowing higher speed operation, especially on open collector-type buses, without excessively loading the bus in other modes of operations.

Description of the Second Alternative Embodiments

Figure 3:
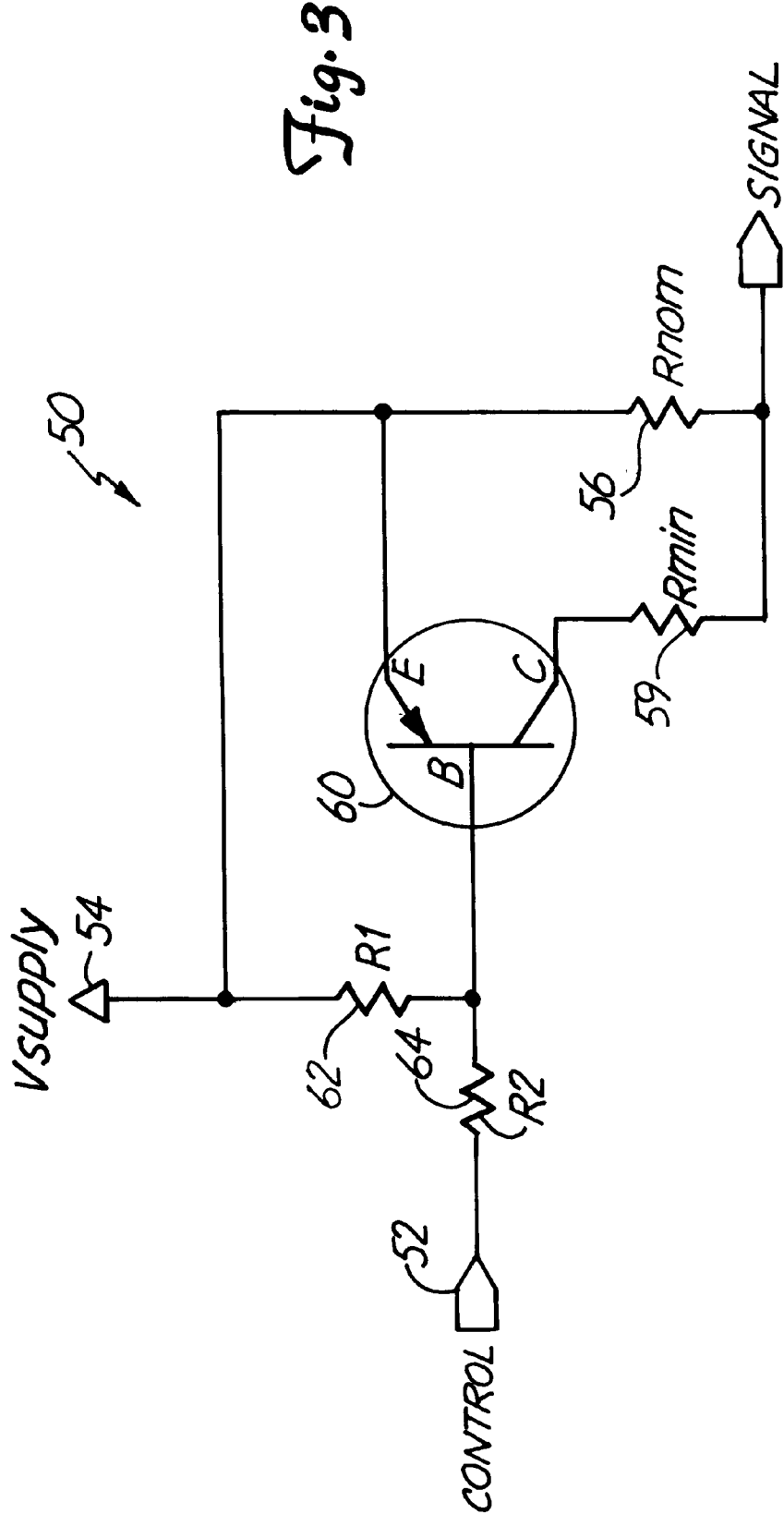
FIG. 3 illustrates an electrical circuit schematic diagram of a second alternative embodiment of an adaptive signal pull-up.

FIG. 3 illustrates an electrical circuit schematic diagram of an adaptive signal pull up termination 50, the present invention, including a control line 52, a power source Vsupply 54, a nominal termination resistance 56, a reduced termination resistance 58, a switching transistor 60, and biasing resistors R1-62 and R2-64. The control line 52 determines the timing of the operation of the switching transistor 60 as later described in detail. The reduced termination resistance Rmin is operation dependent, and can be utilized during certain busing operations, resulting in a reduction of power and a cooler running, more reliable computer. The adaptive termination provides termination for the mode of operation, allowing higher speed operation, especially on open collector-type buses, without excessively loading the bus in other modes of operations.

Description of the Third Alternative Embodiments

Figure 4:
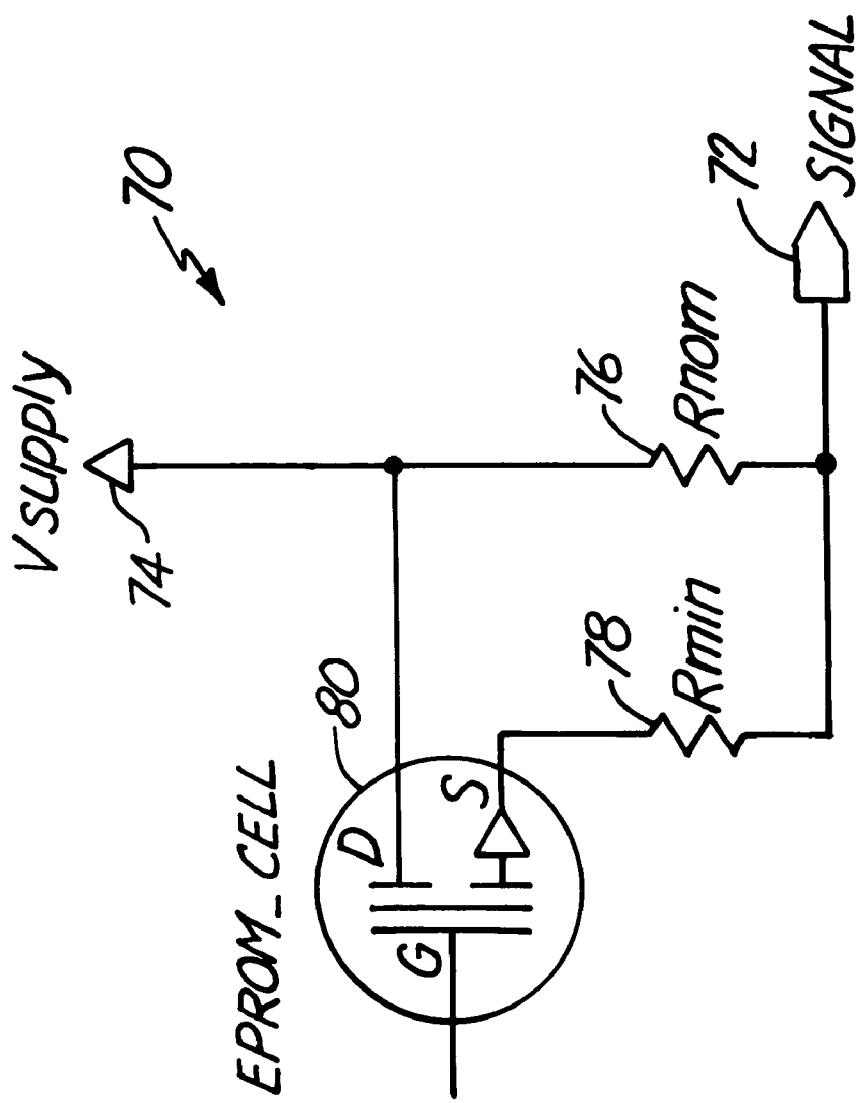
FIG. 4 illustrates an electrical circuit schematic of a third alternative embodiment of an EPROM cell based device; and, FIG. 5 illustrates an electrical circuit schematic of a fourth alternative embodiment of a multiple value.

FIG. 4 illustrates an electrical circuit schematic diagram of an EPROM cell based device 70, the present invention, including a signal bus 72, a power source Vsupply 74, a nominal termination resistance Rmom 76, a reduced termination resistance Rmin 78, and an EPROM cell 80. The reduced termination resistance Rmin is application dependent, allowing a single component to be programmed to the correct value for many possible applications. It also allows for multiple values within a single device, again each programmed for the desired termination value. An EPROM pull down or EPROM multiple value pull down can also be utilized.

Description of the Fourth Alternative Embodiments

Figure 5:
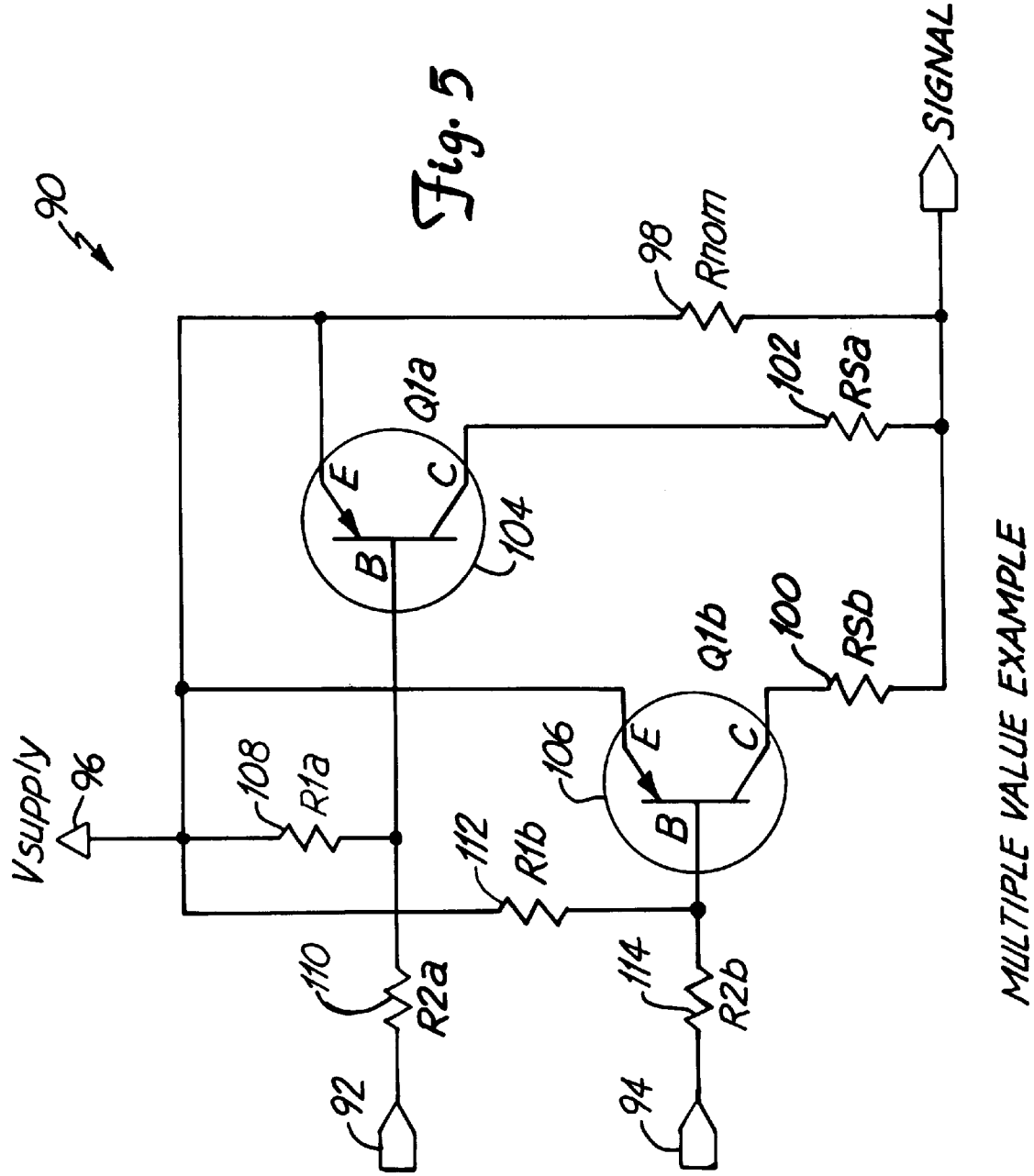

FIG. 5 illustrates an electrical circuit schematic diagram of a multiple value device 90, the present invention, including control buses 92 and 94, a power source Vsupply 96, a nominal termination resistance Rnom 98, reduced termination resistances 100 and 102, and transistor switches 104 and 106. The control buses 92 and 94 determine the timing of the operation of the transistor switches 104 and 106 as later described in detail. Resistors 108, 110, 112 and 114 are biasing resistors. The reduced termination resistances 100 and 102 are operation dependent, and can be utilized during certain busing operations, resulting in a reduction of power and a cooler running, more reliable computer. The adaptive termination resistances provide termination for the mode of operation, allowing higher speed operation, especially on open collector-type buses, without excessively loading the bus in other modes of operations.

Various modifications can be made to the present invention without departing from the apparent scope hereof.

I claim:

1. A computer system having a mode switch for controlling termination of a computer bus comprising:
   (a) a power supply;
   (b) a computer bus;
   (c) a first resistor of a nominal value connected between the power supply and the computer bus in a first termination mode;
   (d) a second resistor operably connected via a switch between the power supply and the computer bus; and
   (e) a control line connected to the switch for controlling the switch to connect the second resistor in an alternate termination mode.

2. The computer system of claim 1 wherein said computer bus is a CPU data bus.

3. The computer system of claim 1 wherein said computer bus is a CPU address bus.

4. The computer system of claim 1 wherein said switch is a switching transistor.

5. The computer system of claim 1 wherein said switch is an EPROM cell device.

6. A computer system comprising:
   (a) a bus having a plurality of operating modes, including a first operating mode and a second operating mode;
   (b) an adaptive bus termination having:
      (1) a first termination resistance value; and
      (2) a second termination resistance value;
   wherein the second termination resistance value is lower than the first termination resistance value, and wherein the bus is selectively terminated by the second termination resistance value when the bus is operating in the second operating mode and wherein the bus is terminated by the first termination resistance value when the bus is operating in the first operating mode.

7. A computer system having a computer bus operably connected to a power supply comprising:
   (a) a first bus termination resistance connected between the computer bus and the power supply in a first termination mode;
   (b) a second bus termination resistance; and
   (c) an adaptive connector for selectively connecting the second termination resistance between the computer bus and the power supply to make a second termination mode with electrical characteristics different from the first termination mode.

* * * * *